United States Patent [19]

Brännström et al.

[11] Patent Number: 4,498,286

[45] Date of Patent: Feb. 12, 1985

[54] GAS TURBINE PLANT WITH A FLUIDIZED BED COMBUSTION CHAMBER

[75] Inventors: Roine Brännström, Finspong; Sven-Erik Kreij, Linköping, both of Sweden

[73] Assignee: Stal-Laval Turbin AB, Finspong, Sweden

[21] Appl. No.: 502,838

[22] Filed: Jun. 9, 1983

[30] Foreign Application Priority Data

Jun. 14, 1982 [SE] Sweden .................................. 8203665

[51] Int. Cl.³ .......................... F02G 3/00; F02C 9/00
[52] U.S. Cl. .................................... 60/39.1; 60/39.25; 60/39.464
[58] Field of Search .................. 60/262, 39.464, 39.12, 60/39.181, 39.182, 39.1, 39.25, 39.29, 39.5, 731; 122/40; 431/7, 170; 110/263

[56] References Cited

U.S. PATENT DOCUMENTS 4,281,510 8/1981 Borjesgard et al. ............. 60/39.464
4,315,400 2/1982 Cole et al. .......................... 60/39.02

*Primary Examiner*—Carlton R. Croyle
*Assistant Examiner*—Timothy S. Thorpe
*Attorney, Agent, or Firm*—Pollock, Vande Sande & Priddy

[57] ABSTRACT

A gas turbine plant comprises a compressor, a turbine and, therebetween, a pressurized container containing a combustion chamber with a fluidized bed. The plant further comprises a valve means for shutting off the compressor and the turbine, respectively, from the combustion chamber at a sudden load drop out and a valved by-pass duct for direct connection of the compressor and the turbine.

At a rapid load drop out, when the valve means are operated to shut off the combustion chamber from the compressor and the turbine and there is a direct connection between the compressor and the turbine, the fluidized bed of the combustion chamber is passivated, by short-circuiting, by means of a further valve means which connects the pressurized container supplying combustion air to the inlet side of the combustion chamber with the outlet side of the combustion chamber, so that the fluidized bed collapses and the air flow through it is interrupted.

8 Claims, 3 Drawing Figures

GAS TURBINE PLANT WITH A FLUIDIZED BED COMBUSTION CHAMBER

FIELD OF THE INVENTION

This invention relates to a gas turbine plant which contains a fluidized bed in a combustion chamber interposed between a compressor and a turbine. The compressor feeds pressurized air to a container surrounding a combustion chamber where it is fed to the fluidized bed. Fuel, e.g. solid fuel, is burnt in the fluidized bed and combustion gas therefrom is fed to the turbine. When a sudden reduction in turbine load arises for any reason, the combustion chamber has to be isolated from the compressor and turbine (which are now directly connected together).

BACKGROUND OF THE INVENTION

Use of the fluidized bed combustion chamber has proved to be an advantage in the operation of gas turbines, since by using a pressurized fluidized bed it is possible to drive a gas turbine with many different kinds of fuel, among other things with solid fuels. However, such a combustion chamber, when at operating conditions, represents a substantial store of energy, and this energy store must be taken into consideration if a rapid load drop out on the turbine arises, especially if a solid fuel is being used in the combustion chamber. During such a load drop out, the combustion chamber is by-passed and blocked off from the compressor and the turbine so that the supply of hot combustion gas from the combustion chamber to the turbine ceases. At the same time, the combustion chamber has to be reduced to zero power and possibly also relieved of pressure.

In this connection, there are in principle two different possibilities for tackling the problems posed by the now redundant, but still fully operational combustion chamber.

One possibility involves equalizing the pressure between the cold and hot sides of the combustion chamber, so that the fluidized bed collapses and, since the air supply thereto is stopped, so that the combustion within the bed also practically ceases. Thereafter, in many cases, the bed will be cooled by cooling tubes passing through the bed, through which tubes, water, steam or gas flow. When a long drop out period is anticipated, the pressure in the combustion chamber should, at an early opportunity, be discharged to the surrounding environment in some way.

The other possibility is to allow combustion within the fluidized bed to continue after the fuel supply has been stopped, and to use the compressed air which remains in and around the combustion chamber to burn off the residual fuel that remains in the fluidized bed, the hot gases from the bed now being discharged to the surroundings.

Whichever method is chosed for dissipating the stored energy in the combustion chamber, it is most important not to choose a method which is something in between these two methods, since this could lead to the development of large quantities of carbon monoxide which, together with the compressed air remaining in the container surrounding the combustion chamber, could introduce a grave risk of an explosion occurring.

SUMMARY OF THE INVENTION

The present invention is an extension of the first method, whereby, according to the invention, valve means are arranged for short-circuiting the inlet and outlet sides of the fluidized bed.

According to the invention there is provided a gas turbine plant comprising a compressor, a turbine, a pressurized combustion chamber between the compressor and the turbine with a fluidized bed having an inlet side and an outlet side, first and second valve means for shutting off, respectively, the compressor and the turbine from the combustion chamber, third valve means for direct connection of the compressor and the turbine when cutting out the turbine load, and fourth valve means for short-circuiting the fluidized bed by connecting said inlet and outlet sides on occurrence of drop out of the turbine load. The fourth valve means is arranged to connect the outlet side of the combustion chamber with the combustion air space of the container enclosing the combustion chamber.

Using a plant in accordance with the invention, the pressure between the two sides of the fluidized bed is equalized so that the bed collapses and the combustion is stopped. At the same time, another very important event occurs, namely the relatively cold compressed air from the container enclosing the combustion chamber is blown out towards the second valve means which is mounted on the inlet side of the turbine. The second valve means is normally never quite gas tight because it operates at high temperatures due to the hot combustion gases and because of the unavoidable residues of ash particles brought along by the combustion gases. If hot gases should leak through the second valve means when in its shut off condition, this would normally lead to the relieved turbine reaching impermissible speeds. However, because the fluidized bed is short-circuited, a great amount of cold air will be mixed with the hot combustion gases before being supplied to the second valve means at the inlet side of the turbine, resulting in a relatively cool gas mixture being admitted to the turbine, which therefore reduces its speed rapidly.

The fourth valve means for the short-circuit of the fluidized bed can be positioned at different locations, either outside or inside the container enclosing the combustion chamber. However, it should preferably be placed as close as possible to the second valve means (i.e. the inlet valve of the turbine) to achieve the best possible cooling of this valve means and thus of the gas mixture which leaks through the second valve means.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
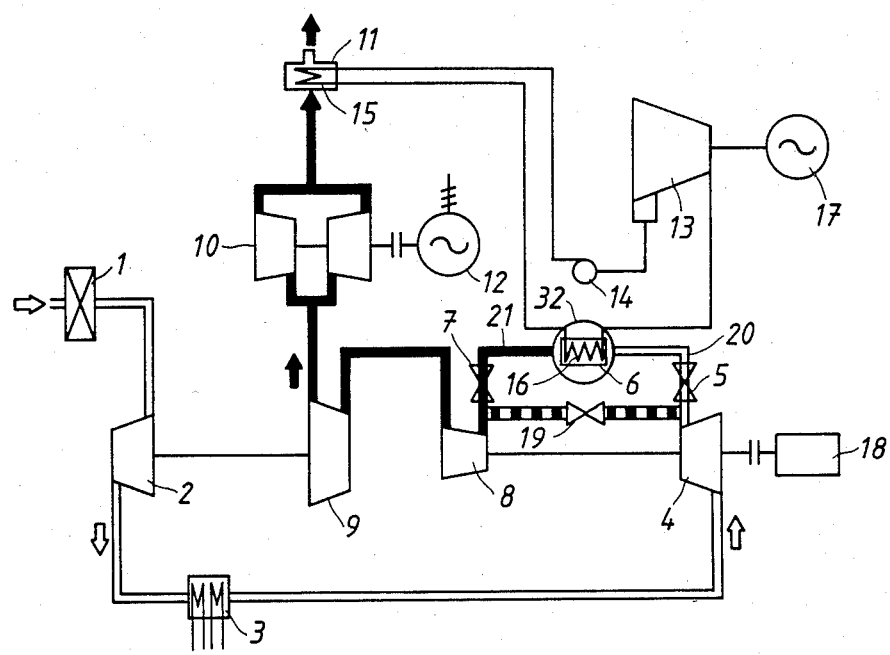
FIG. 1 is a schematic diagram showing the principle of a prior art gas turbine plant.

FIG. 1 shows a known embodiment of a gas turbine plant where the gas turbine side includes three turbines in series for driving high and low pressure turbines and a generator, while at the same time the plant is supplemented with a steam cycle which includes a steam turbine driving a second generator.

The gas turbine circuit starts with an air filter 1 upstream of a low pressure compressor 2. Compressed air from the compressor 2 passes through an intermediate cooler 3 to a high pressure compressor 4, the outlet side of which is connected through a valve 5 to a fluidized bed combustion chamber 6. Through a valve 7, hot gases from the combustion chamber 6 pass to a high pressure turbine 8, and then, in turn, to a low pressure turbine 9, a power turbine 10 and a heat exchanger 11 before being discharged to a chimney (not shown). The power turbine 10 drives a generator 12. The plant has furthermore been provided with a steam circuit comprising a steam turbine 13, from where condensate, by means of a pump 14, is fed to a tube coil 15 in the heat exchanger 11 and further to a boiler coil 16 in the combustion chamber 6 and from there back to the turbine 13 which drives a generator 17. In addition, FIG. 1 shows a starting motor 18 which can be used, on start-up, to generate the high pressure required in the plant.

The multishaft embodiment of plant shown in FIG. 1 is nowadays common in large plants. Steam can feed a turbine, as shown, or it may be connected to some heating process. The essential point according to the invention is the fact that a compressor (4) and a turbine (8) are provided, respectively, upstream and downstream of a pressurized fluidized bed combustion chamber 6, preferably one designed for solid fuel operation.

On the occasion of a rapid load reduction on the plant (i.e. a drop out of the turbine load), the combustion chamber 6 is short-circuited by means of a valve 19 while at the same time the combustion chamber 6 is blocked from the compressor 4 and the turbine 8 by means of the valves 5 and 7.

The problem to which this invention addresses itself is how to safely passivate the combustion chamber 6 with its great contents of unburnt fuel and its high thermal and pressure energy reserves. This will now be explained in greater detail with reference to FIG. 2.

As mentioned previously, it is important to equalize the pressure on the two sides of the fluidized bed so that the latter is caused to collapse, while at the same time the air flow through the fluidized bed is interrupted, so that combustion ceases very rapidly without appreciable amounts of carbon monoxide being formed.

Figure 2:
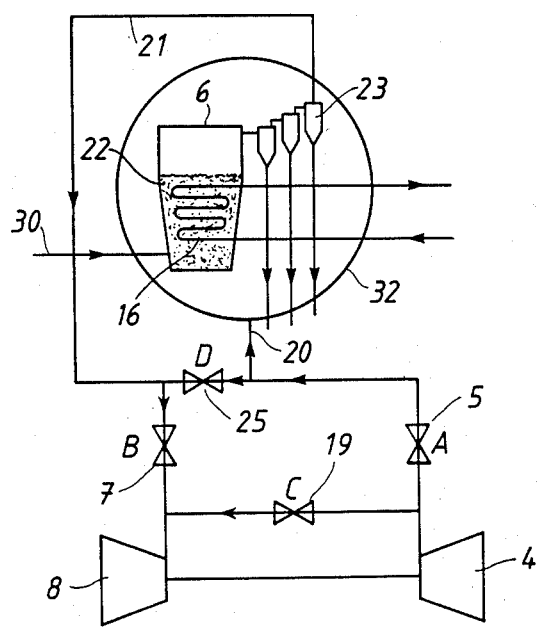
FIG. 2 shows how the plant of FIG. 1 is modified by the provision of a valve for short-circuiting the fluidized bed combustion chamber to provide a gas turbine plant according to the invention.

FIG. 2 shows the combustion chamber 6 enclosed in a container 32, the high pressure compressor 4, the high pressure turbine 8, the conduits 20 and 21 and the valves 5, 7 and 19. The combustion chamber 6 contains a fluidized bed 22 with a cooling coil 16, which may be a boiler coil or be traversed by gas, air or steam, all according to the plans for the plant, and having fuel, e.g. solid fuel, supplied via conduit 30. The compressed air from the compressor 4 passes through the conduit 20 to the container 32 and the hot combustion gases from the combustion chamber 6 pass through cyclones 23 and the conduit 21 to the turbine 8.

According to the invention, the combustion chamber 6 is short-circuited by a valve 25, after the valves 5 and 7 have been closed, so that the pressure is equalized between the two sides of the combustion chamber (i.e. between inlet and outlet sides of the fluidized bed 22).

During normal operation, the valve 7 is constantly subjected to the hot combustion gas, which means that this valve has to be very robust and heat-resistant. In spite of this—or perhaps because of it—it is virtually impossible to design this valve so as to be completely gas tight, and therefore a certain amount of gas leakage occurs in practice when the valve 7 is in its closed position. This means that hot gases may continue to flow to the turbine after the valves have been closed, which may mean that the relieved power turbine (10 in FIG. 1) may race. This can be counteracted by placing the valve 25 as close to the valve 7 as possible, so that the cold compressed air with higher pressure counteracts the supply of hot combustion gas.

Figure 3:
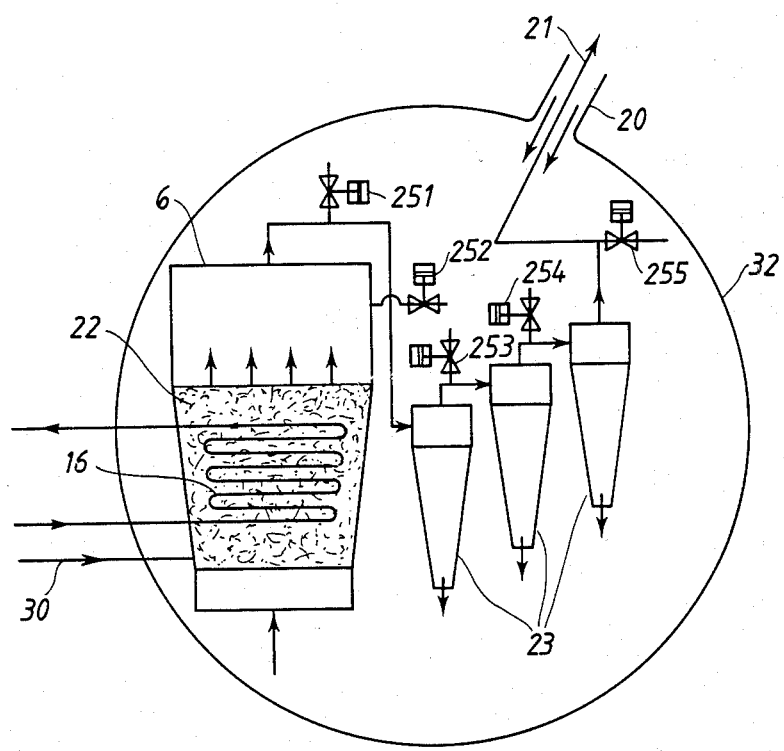
FIG. 3 shows in more detail an alternative fluidized bed combustion chamber of a gas turbine plant according to the invention with a number of different alternative locations for the short-circuit valve.

If the plant is designed so that a certain amount of leakage of hot gas through the valve 7 can be allowed, this increases the freedom when choosing the location of the valve 25. In FIG. 3, there is shown in more detail the location of a fluidized bed 22 in a combustion chamber 6, which is provided with cleaning cyclones 23 and is enclosed within a container 32 pressurized by compressed air flowing through conduit 20 as shown by the pair of arrows inside the connection between conduit 20 and container 32. Arrow 33 represents the inlet for compressed air flowing from container 32 into combustion chamber 6 so as to fluidize bed 22. Instead of locating the short-circuit valve 25 outside the container 32, alternative locations on the fluidized bed or the cyclones have been shown, marked at 251, 252, 253, 254 and 255. It must then be taken into account that a mixture of colder compressed air and hot gas may leak through the conduit 21 and the valve 7 to the turbine 8.

The drawings show specific arrangements within the scope of the invention and these should be taken as examples which do not limit the invention. Various modifications are possible to the arrangements described and illustrated above within the scope of the following claims.

What is claimed is:

1. A gas turbine plant comprising:
 a compressor;
 a turbine;
 a pressure container for containing combustion air compressed by said compressor;
 a combustion chamber enclosed in said container and surrounded by said compressed air;
 a fluidizable bed within said combustion chamber;
 inlet means for supplying pressurized combustion air from said container to said combustion chamber so as to fluidize said fluidizable bed;
 means for supplying fuel to the fluidized bed;
 conduit means for combustion gas connecting said combustion chamber with said gas turbine;
 a first valve means for shutting off said compressor from said container;
 a second valve means for shutting off said turbine from said combustion chamber;
 a third valve means for direct connection of said compressor and said turbine when cutting out a turbine load; and
 a fourth valve means for short-circuiting the fluidized bed by connecting the outlet side of said combustion chamber with said compressed air contained in said container and surrounding said combustion chamber.

2. A gas turbine plant according to claim 1, wherein said fourth valve means for short-circuiting the fluidized bed and said third valve means for connecting the compressor and turbine are in conduits connected in parallel between said first valve means and said second valve means.

3. A gas turbine plant according to claim 2, wherein said fourth valve means is located in the immediate vicinity of said second valve means for shutting off the turbine from the combustion chamber.

4. A gas turbine plant according to claim 1, wherein said fourth valve means is located outside said pressure container and comprises a valved conduit connected between said conduit means for combustion gas and a duct of a supply means for supplying compressed combustion air from said compressor to said pressure container.

5. A gas turbine plant according to claim 1, wherein said fourth valve means is located inside said pressure container.

6. A gas turbine plant according to claim 5, wherein said fourth valve means is connected to said conduit means for combustion gas.

7. A gas turbine plant according to claim 6, wherein said conduit means for combustion gas includes gas cleaning equipment within said pressure container.

8. A gas turbine plant according to claim 1, wherein said conduit means for combustion gas includes gas cleaning equipment within said pressure container.

* * * * *